United States Patent [19]

Johnson, Sr.

[11] Patent Number: 4,619,331
[45] Date of Patent: Oct. 28, 1986

[54] PROTECTIVE SURROUND FOR PACKER WHEELS

[76] Inventor: Gerald T. Johnson, Sr., R.R., P.O. Box 76, Kulm, N. Dak. 58456

[21] Appl. No.: 757,291

[22] Filed: Jul. 22, 1985

[51] Int. Cl.⁴ .......................... A01C 7/20; A01C 13/00
[52] U.S. Cl. .............................. 172/518; 301/63 DD; 172/538
[58] Field of Search ................. 301/86, 39 R, 39 CC, 301/95, 96; 172/536, 537, 538, 534, 535, 518, 539; 111/85

[56] References Cited

U.S. PATENT DOCUMENTS

| | | | |
|---|---|---|---|
| 61,326 | 1/1867 | Doolittle | 172/539 |
| 877,685 | 1/1908 | Warner | 172/535 |
| 970,476 | 9/1910 | Dodd | 301/86 X |
| 1,057,141 | 3/1913 | Garst | 172/538 |
| 1,444,224 | 2/1923 | Wagner | 172/537 X |
| 2,040,710 | 5/1936 | Riehl | 172/537 X |
| 3,228,485 | 1/1966 | Ten Pas | 172/538 |
| 4,020,906 | 5/1977 | Wells | 172/539 |
| 4,522,268 | 6/1985 | Morris | 172/518 |

*Primary Examiner*—Richard J. Johnson
*Attorney, Agent, or Firm*—Harvey B. Jacobson

[57] ABSTRACT

A packer wheel for a farm implement is reinforced by a band of angle-section metal welded around the periphery of the wheel with the edges of respective webs of the band engaging outer surfaces of respective half shells of the wheel.

4 Claims, 4 Drawing Figures

PROTECTIVE SURROUND FOR PACKER WHEELS

BACKGROUND OF THE INVENTION

This invention relates to packer wheels for use on agricultural equipment.

Many farm implements such as grain drills, row crop planters, air seeders and soil packers for use in diverse applications, use steel packer wheels. Commonly, such wheels are formed from a pair of shallow cup-like half shells joined face to face by welding, the welding bead being on the circumferential wear surface of the hollow wheel. Farm implements using the welded packer wheels are subject to hard wear in normal use and may further be subject to abuse by running the packer wheels on hard pavement or the like which rapidly wears or even destroys the wheels, for example, by wearing down the weld seam and eventually splitting the wheel.

It is an object of the invention to provide a means and method for reinforcing steel packer wheels so as to prolong the life thereof, and which is applicable with equal facility both to new and to used wheels.

A further object of the invention is to provide a means and method as aforesaid which is of simple and economical application, and which can readily be effected in situ.

STATEMENT OF PRIOR ART

Applicant is aware of the following U.S. patents, the relevance of which is that they relate to diverse wheel structures and the like. None of the patents, however, discloses the features of the present invention.

U.S. Pat. No. 36,356—A. W. Brinkerhoff—Sept. 2, 1862
U.S. Pat. No. 313,563—H. Weddle—Mar. 10, 1985
U.S. Pat. No. 463,740—F. P. Circle—Nov. 24, 1891
U.S. Pat. No. 970,476—W. L. Dodd—Sept. 20, 1910
U.S. Pat. No. 1,396,037—S. H. Garst—Nov. 8, 1921
U.S. Pat. No. 2,950,770—R. W. Wilson—Aug. 30, 1960
U.S. Pat. No. 4,020,906L. H. Wells—May 3, 1977

SUMMARY OF THE INVENTION

Broadly stated, the invention consists in reinforcing the periphery of a steel packer wheel of the type described by a surrounding metal band or cap of angle iron rolled into circular form, preferably of a diameter somewhat less than the diameter of the wheel, the band being cut to length, placed around the periphery of the wheel with the ends of the angle iron webs engaging the opposed halves of the wheel and the band being welded in place by spot welding or the like.

For the reinforcement of new or worn packer wheels, for example, pre-rolled reinforcement bands may be provided rolled to the required diameter, but having a length somewhat in excess of that required so that the ends of the band overlap. A band may be resiliently snapped over a wheel to be capped, marked for length, removed and cut to length, replaced around the wheel and welded in place by a weld seam at the ends of the band and spot weld along its length.

The reinforcement bands can be made in different thickness and added strength to resist denting from rocks and splitting open of wheels after the original welding bead has become worn. The cost of fitting the reinforcement band is significantly lower than the replacement cost of a wheel, and the reinforcement band provides a structure which may be stronger than the original wheel. The latter consideration provides a basis for reinforcing new wheels. The invention can be effected speedily and easily without having to remove the packer wheels from the equipment on which they are mounted, and can be applied substantially to any size of packer wheel.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
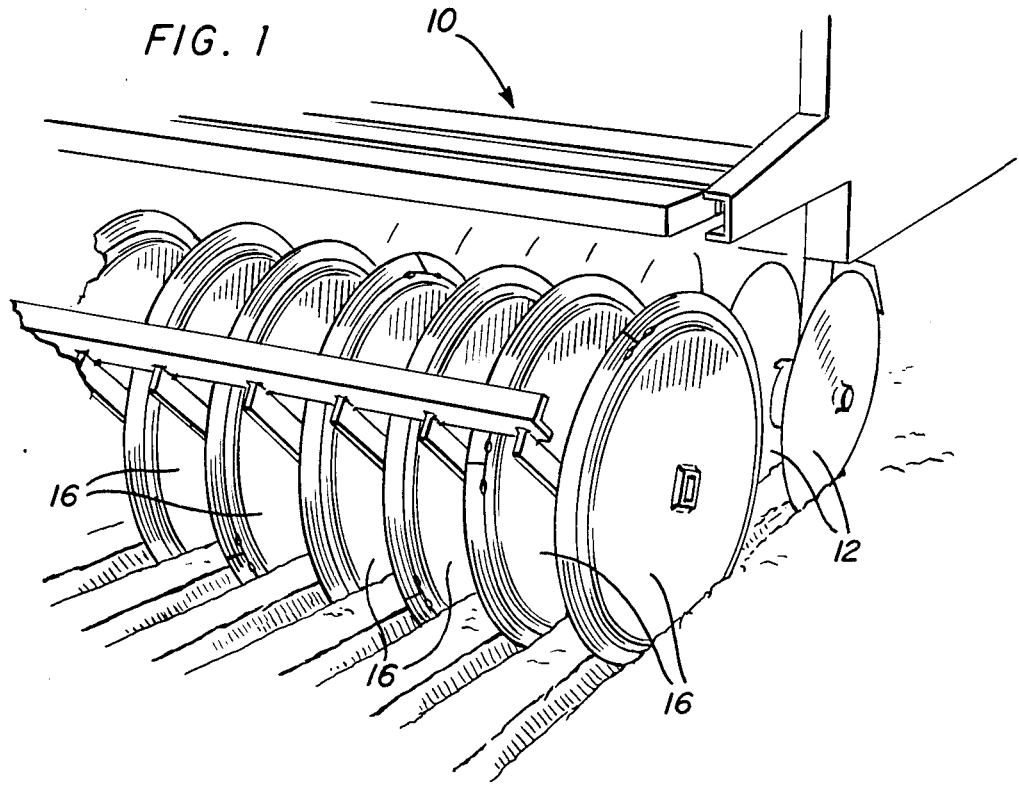
FIG. 1 is a perspective view of part of a grain drill showing an assembly of packer wheels reinforced in accordance with the invention.

Referring to FIG. 1, there is illustrated a known form of grain drill 10 having furrowing discs 12 and an assembly of individual packer wheels 16. The packer wheels are reinforced, in accordance with the invention, by peripheral bands or caps 18, as will be described.

Figure 4:
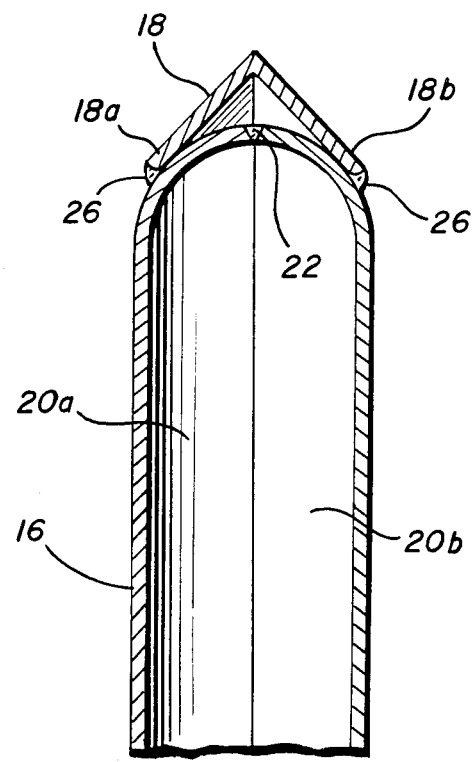
FIG. 4 is an enlarged sectional view on line 4—4 of FIG. 3.

As shown more particularly in FIG. 4, each packer wheel 16 comprises left and right shallow cup-like steel half shells 20a, 20b welded together around the peripheries by a circumferential weld seam 22. In conventional packer wheels of this nature, seam 22 is commonly left exposed, so that continuous use of the wheel causes wear on the seam which may eventually lead to splitting of the wheel. Thus, in accordance with the invention, wheel 16 is protected by a band or cap 18 and it is understood that such bands may be attached either when the wheel is new or after it has been in use.

Figure 2:
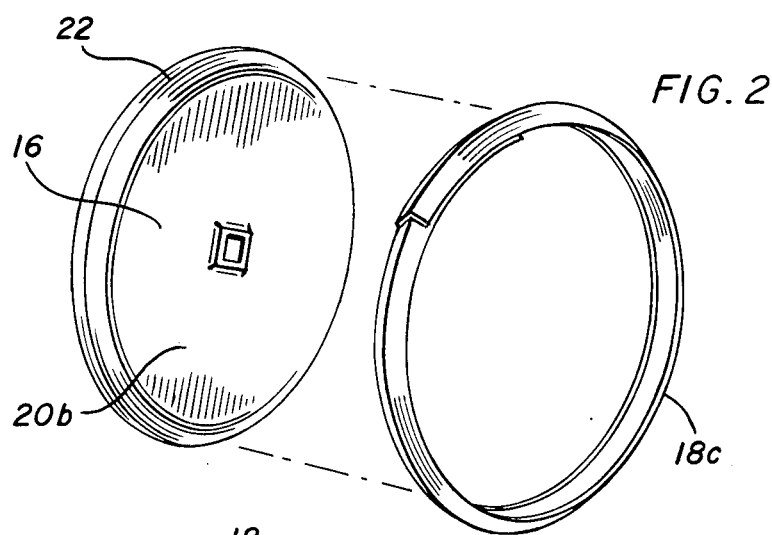
FIG. 2 is an exploded perspective view of a packer wheeler and protective reinforcement band therefor.
Figure 3:
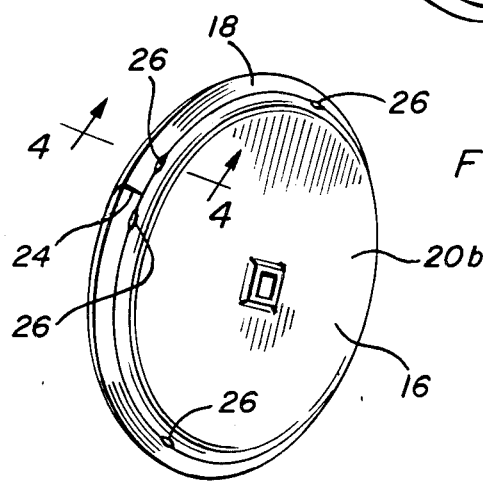
FIG. 3 is a perspective view of a reinforced packer wheel.

Band or cap 18 is formed from a length of angle iron of suitable dimension such that the edges 18a, 18b of its respective webs will contact the outsides of the respective half shells 20a, 20b (see FIG. 4). The thickness of the band will depend on its wear requirements and may typically be about a ¼ inch or 5/16 inch. Preferably, the band will initially be supplied as a length 18c (FIG. 2) which has been rolled to a diameter slightly less (e.g. by about 1 inch) than that of wheel 16, but which has a length in excess of that required to cover the circumference of the wheel. This insures, for example, that irregularities in diameters of packet wheels will be accommodated.

The overlength band initially is resiliently snapped over the circumference of the wheel, with its ends overlapping, the correct length of the band is marked thereon, the band is removed, cut to length, and reapplied to the wheel, its reduced diameter insuring that it will properly hug the wheel. Finally, the adjacent ends of the band may be welded together by a weld seam 24, and the band may be spot welded at circumferentially spaced locations 26 to the respective half shell 20a, 20b of the wheel, typically with four or more spot welds per half shell.

While the reinforcing means of the present invention is of generally simple construction and application, it is instrumental in significantly strengthening packer wheels and extending their useful life, inter alia, by protecting weld seam 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A packer wheel for a farm implement comprising a pair of shallow cup-like metal half shell members circumferentially secured together by welding, and circumferential reinforcing means for the wheel comprising a surrounding band of generally right angle-section metal having radially inwardly diverging webs with edge portions engaging outer peripheral surfaces of the respective half shell members to enclose said circumferental weld of said half sheel members and being welded thereto.

2. The invention of claim 1 wherein adjacent ends of the band are welded together and the webs of the band are welded to the respective half shell members by circumferentially spaced spot welds.

3. The invention of claim 1 wherein the packer wheel is made by a process comprising providing a rolled length of angle-section metal for the band having a diameter less than the diameter of the wheel and a length suited to the circumference of the wheel, snapping the length of metal onto the wheel around its periphery and welding the length of metal to the wheel to form the reinforcing means.

4. The invention of claim 3 wherein the angle-section metal is intially supplied in a length in excess of the length required to extend around the periphery of the wheel, the method including the steps of snapping the overlength band around the wheel periphery, marking the length of band required, removing the band, and cutting same to length.

* * * * *